No. 780,539. PATENTED JAN. 24, 1905.
J. THODE, DEC'D.
W. THODE, ADMINISTRATOR.
HYDRAULIC INTERNAL RIVETER FOR PIPES.
APPLICATION FILED AUG. 12, 1903.
2 SHEETS—SHEET 1.
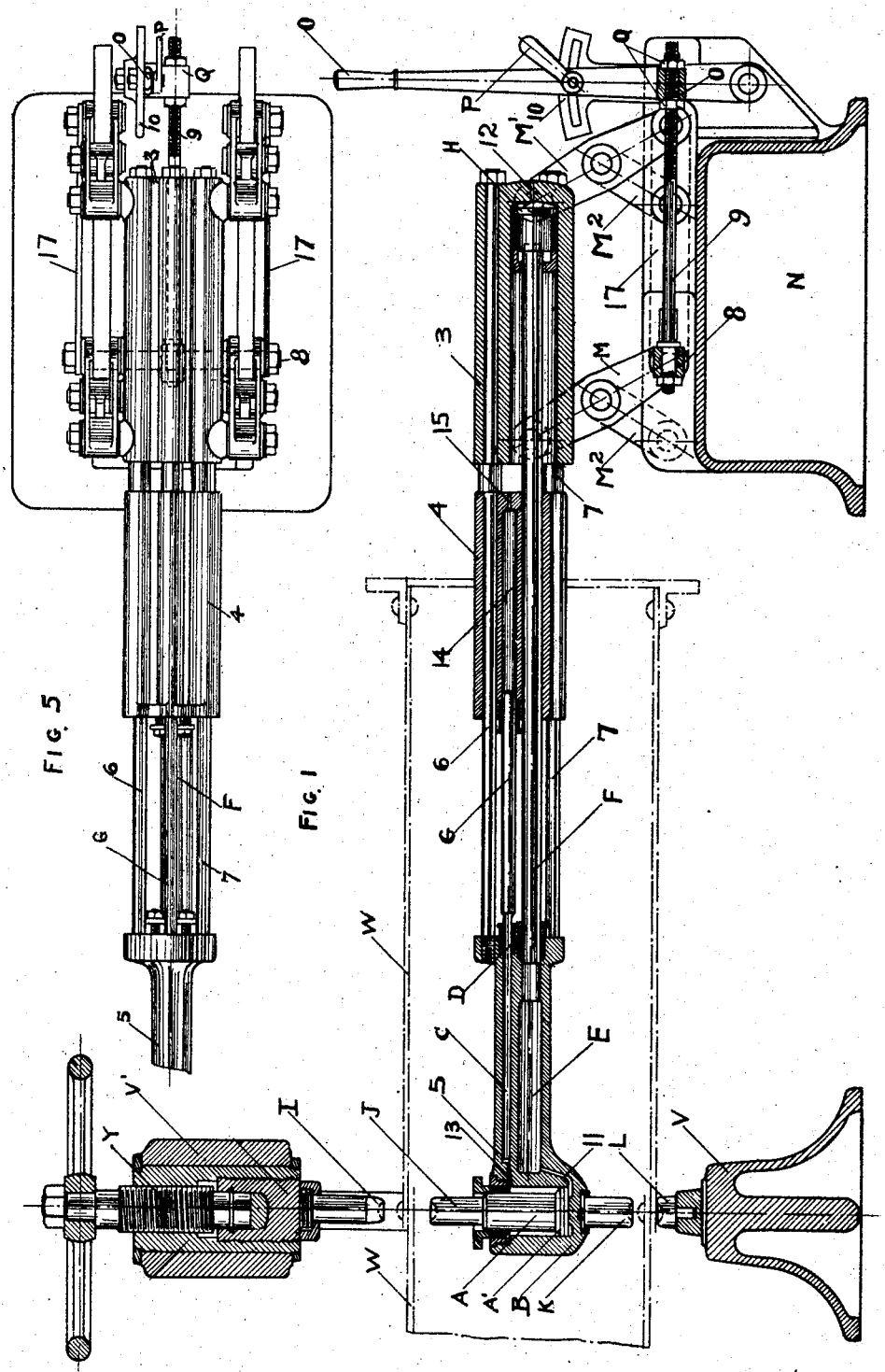
INVENTOR:
John Thode.

No. 780,539. PATENTED JAN. 24, 1905.
J. THODE, DEC'D.
W. THODE, ADMINISTRATOR.
HYDRAULIC INTERNAL RIVETER FOR PIPES.
APPLICATION FILED AUG. 12, 1903.
2 SHEETS—SHEET 2.
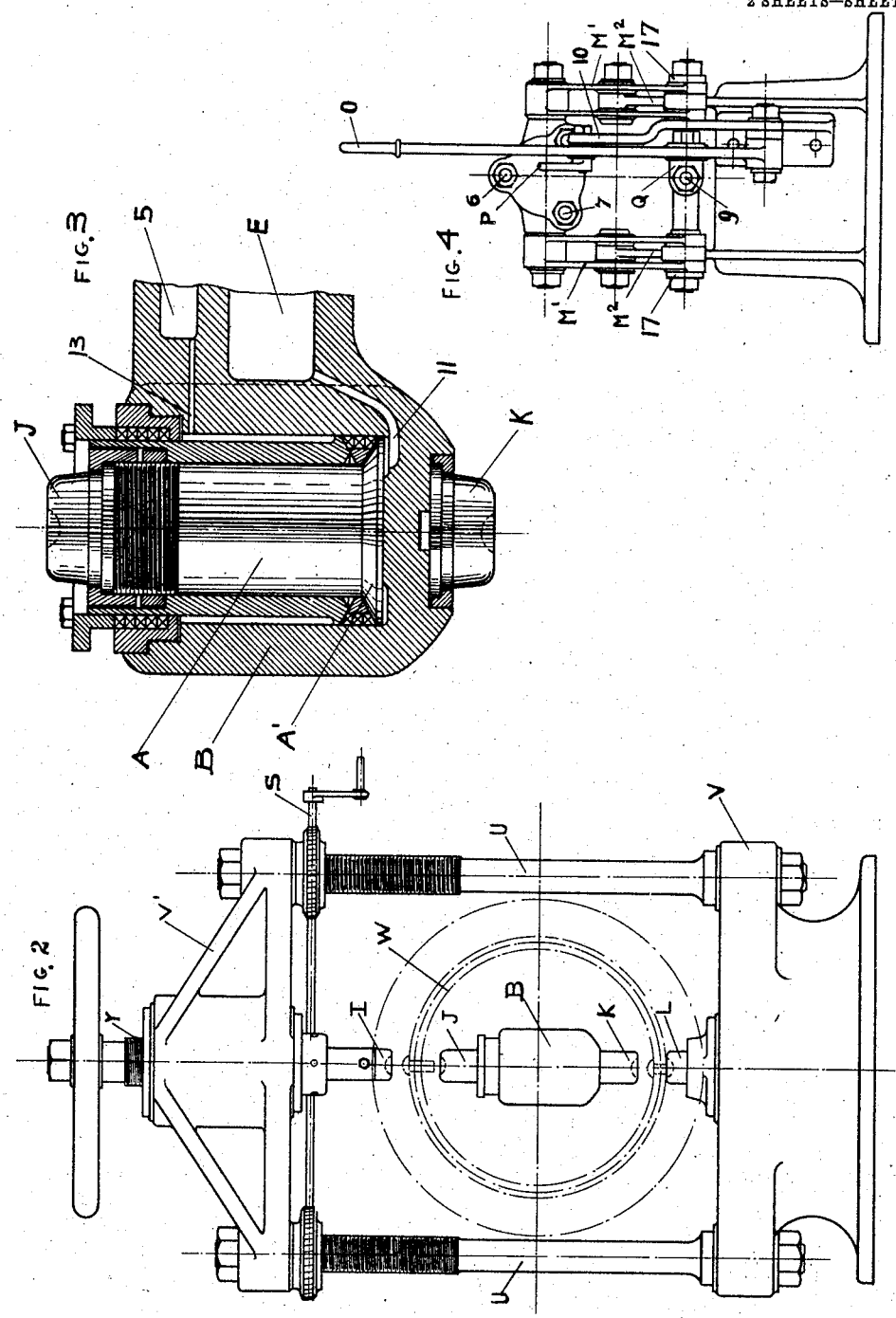
WITNESSES:
INVENTOR:
John Thode.

No. 780,539.

Patented January 24, 1905.

UNITED STATES PATENT OFFICE.

JOHN THODE, OF MILWAUKEE, WISCONSIN; WILLIAM THODE ADMINISTRATOR OF SAID JOHN THODE, DECEASED.

HYDRAULIC INTERNAL RIVETER FOR PIPES.

SPECIFICATION forming part of Letters Patent No. 780,539, dated January 24, 1905.

Application filed August 12, 1903. Serial No. 169,191.

*To all whom it may concern:*

Be it known that I, JOHN THODE, residing at Milwaukee, in the county of Milwaukee and State of Wisconsin, have invented a new and useful Improvement in Hydraulic Internal Riveters for Pipes, of which the following is a description, reference being had to the accompanying drawings, which are a part of this specification.

Heretofore machines have been provided and used for riveting together sections of pipe, with which machines the rivets were upset or headed on the outside of the pipe, and such machines are of large size and very expensive in construction and are only adapted for use in riveting together sections of pipe of large size or considerable diameter.

The object of my invention is to provide a machine adapted for riveting together sections of pipe of small diameter, even sections of pipe of six inches in diameter or perhaps less.

Also my improved machine is adapted to upset or head the rivet on the inside of the pipe, thus providing for inserting the rivet through the sections of pipe from the outside, leaving the neatly-finished head of the rivet exposed on the outside of the pipe and heading it down with a less well finished end on the inside.

The machine can also be made in comparatively small and compact form, of relatively light weight, and at a minimum of expense, since, because of its peculiar construction and novel method of operation, the machine is not required to be built as heavy, even in comparison, as the present machines are that are employed for heading rivets on the outside.

The machine is constructed to be operated by hydraulic power, and valuable features of the invention exist in the improved construction employed to apply the hydraulic power to the riveting devices or tools of the machine.

Other novel features of my improved machine are incidental to these chief features and are hereinafter pointed out.

The invention consists of the machine, its parts, and combinations of parts, as herein described and claimed, or the equivalents thereof.

In the drawings, Figure 1 is a longitudinal section centrally of my improved machine with which a section of pipe and a fragment of a section are shown in broken lines in such position relative to the machine as the sections of pipe occupy during the process of riveting. Fig. 2 is an end view of the machine looked at from the left of Fig. 1. Fig. 3 is a vertical section, on larger scale, of the head or front end of the tool-carrying arm. Fig. 4 is a view at the rear or right-hand end of mechanism shown in Fig. 1. Fig. 5 is a top plan view of a portion of the machine shown in Fig. 1.

In the drawings there is a base or frame N, on which a tool-carrying overhanging and adjustable arm is mounted. The tool-carrying arm consists of a plurality of piston-cylinders 3, 4, and 5, secured together rigidly by a plurality of binding-rods 6 and 7, the cylinders being arranged at little distances apart and in a common axial line. This tool-carrying arm is mounted on the base N by means of sets of arms arranged in pairs complementary to each other on opposite sides of the cylinder 3, the longer member of each pair of arms being pivoted on laterally-projecting trunnions provided therefor on the sides of the cylinder 3, and at their lower ends the front arms M, one on each side of the cylinder, are pivoted to blocks 8, slidable endwise in the upper portion of the base or frame N. The rear arms M' bear at their lower ends and are slidable in ways therefor on the base N. These arms M and M' are connected together by distance-pieces 17, (indicated in Fig. 1 by dotted lines,) one on each side. Branching arms M² M² are pivoted medially to the arms M and M' and at their lower ends are pivoted on the base or frame N. The blocks 8 8 opposite each other are connected by a crosshead, and a rod 9 connects the cross-head to a swinging lever-handle O, pivoted at its lower end to the base N. The rod 9 passes through a stud-pin O', swiveling in the lever-handle O, and is adjustable endwise therein by means of the set-nuts Q Q turning on the rod against the pin. A hand-nut P turns on a bolt through the lever-handle O, which bolt rides in a slot therefor in a segment 10, fixed on the frame, and is adapted for adjusting and setting the lever-handle in any desired position. It will be understood that by this construction the overhanging tool-carrying arm made up of the cylinders 3, 4, and 5 can be raised and lowered, and thereby adjusted for a purpose hereinafter described.

On the lower side of the front or outer cylinder 5 of the tool-carrying arm a leg K is provided, which leg in its lower free end is die-shaped, so as to adapt it to fit onto the head of a rivet, if required, in the pipe-sections W. Directly below this leg K there is a base V, which is provided with a fixed die-formed anvil L, so disposed as to location and height that it is adapted to receive thereon the overlapping sections of the pipe W W and therein when a rivet is in the sections the head of the rivet. By this means the base V, with its anvil L, is adapted to furnish a proper and sufficient support for the pipe-sections while being riveted together. Also by the manipulation of the lever-handle O the overhanging tool-carrying arm is let down onto the anvil L, so as to be supported thereby during the process of upsetting or heading a rivet, as hereinafter described.

In the outer end of the cylinder 5 there is a transverse cylinder-chamber in which is fitted a differential piston A, the body of the piston being of less diameter than the piston-chamber and there being a flange or piston head A' of a diameter equal to the diameter of the piston-chamber. The upper end of the body of the piston fits into and moves through a piston-packing, turning into the wall B of the piston-chamber. On its upper end the piston A carries a die J, having a countersunk end adopted to receive therein the end of a rivet and by its movement against the rivet to upset it and head it on the inside of the pipe-sections. Directly above and at a distance from the die J there is an anvil I, mounted in the head V' on posts U U, which anvil is adjustable toward and from the die J, being complementary thereto. The base V, head V', and posts U U, with related parts, make up the anvils-supporting frame.

It will be understood that by means of the construction described sections W W of pipe may be placed in position on the anvil L for being riveted together by carrying the end section over the tool-carrying arm and letting the overlapping ends of the sections rest down on the anvil L, and when a rivet has been inserted through these sections in a position therefor by letting the rivet-head rest on the anvil L, and thereupon the anvil I can be let down by rotating the screw Y to rest on the head of a rivet inserted from the outside through the overlapping ends of the sections of the pipe. Then the tool-carrying arm can be let down by shifting the lever-handle O so that the leg K will rest on the inside of the pipe-sections directly opposite the anvil L. Thereupon by means hereinafter described the piston A and the die J thereon are forced outwardly under such hydraulic pressure as to cause the die J to upset and head the rivet on the inside of the sections opposite the anvil I. Although this machine is a comparatively small one, yet in pipes of, say, sixteen inches in diameter rivets of one and one-eighth inches in diameter, or thereabout, are employed, and for upsetting and heading a rivet of this size two hundred thousand pounds pressure may be employed.

For providing and applying the necessary hydraulic pressure to the piston A for actuating the die J the cylinder 5 is provided with a chamber E, in which a plunger-piston F is employed, which fits into and substantially fills the piston-chamber, being packed therein at the outer end of the chamber by packing common with hydraulic pistons. From the chamber E a duct 11 leads to the piston-chamber under the head A' of the piston A. This chamber E is filled with a liquid, preferably glycerin, which serves as an operating medium communicating the forward motion of the piston F to the piston A. At its rear end the piston F is provided with an enlarged head H, packed, and thereby fitted in a piston-chamber in the cylinder 3, and a port 12 leads into the cylinder-chamber at the rear of the piston-head, this port being connected to a source of liquid-power supply under the control of the operative, whereby hydraulic power can be applied to and released from the piston F to force it forward or permit of its return to initial position, as desired. The cylinder 5 is also provided with a piston-chamber C, in which a piston D is fitted, substantially filling the chamber, and in which it moves endwise through packing therefor at the rear end of the cylinder. A duct 13 leads from the piston-chamber C into the chamber of the piston A above its enlarged head A'. The chamber C in the cylinder 5 is also filled with liquid, the amount of which when mostly forced into the chamber about the piston A is adapted to fill that chamber above the head A' of the piston, forcing the piston inwardly, bringing the head of the piston to its seat against the inner end of the piston-chamber. This liquid is also preferably glycerin and serves as an operative medium, communicating the motion of the piston forwardly into the cylinder to the piston A above its head A'. The rear enlarged portion G of the piston D enters through a packing and is adapted to substantially fill a chamber 14 in the cylinder 4. A port 15 leads into the chamber 14 at the otherwise-closed end thereof, and this port is connected to a supply of the liquid medium, which is under constant pressure. The construction is such that when there is no pressure on the outer large end of the piston F the constant pressure on the piston G forces the piston D into the cylinder C, driving the fluid agent into the chamber of the piston A above its head A' and forcing that piston inwardly to its seat in the position shown in Fig. 1. When hydraulic pressure is exerted on the outer large end of the piston F by a liquid admitted through the port 12, the piston F is forced into the chamber E and the liquid contents thereof is driven under the head A' of the piston A, forcing it toward the anvil I, against the differentiated and less pressure of the fluid on the other side of the head A', and against the resistance of the non-upset rivet and with such force as to upset and head the rivet. Thereupon by releasing the hydraulic pressure on the large end of the piston F the lesser pressure of the liquid in the chamber C under the action of the liquid in the chamber 14 will force the piston A back to initial position, at the same time carrying the piston F outwardly to its initial position.

It will be understood that this machine can be adapted for riveting together sections of pipe of different sizes by raising or lowering the anvil I and by at the same time changing the die J and the leg K for similar members of a suitable length to adapt the construction for use with such different sizes of pipes and also centering the tool-carrying arm or tool-carrier in the pipe by means provided therefor.

What I claim as my invention is—

1. For a riveting-machine, a tool-carrier provided with a piston-chamber, a die-actuating piston in the chamber having differentiated surfaces for the action in opposite directions differentially of a liquid power medium, a second piston fitted and movable in a second chamber in the tool-carrier adapted to force a liquid medium through a duct from the second chamber into the first piston-chamber against the head of the piston, and a third piston of smaller size than the second piston fitted and movable in a third chamber in the tool-carrier adapted to force liquid into the chamber of the first piston against a smaller portion of the piston and opposite to the action of the second piston.

2. For a riveting-machine, a tool-carrier comprising a plurality of sections secured together in a longitudinal right line, a transversely-disposed die-carrying differential piston in the outer or front section, said section being provided with differential piston-chambers and connected severally by a duct to the chamber of the transverse piston respectively above and below the differential head of the piston and adapted to hold a constant liquid actuating medium, pistons in said differential chambers and extending into other piston-chambers in the other sections, said last-enumerated chambers being provided with means for introducing a liquid actuating medium thereto.

3. An elongated hydraulic motor, comprising a plurality of elongated members secured to each other at a distance apart in a right line each member having a piston chamber or chambers, the front member being provided in its front end with a transversely-disposed piston-chamber and at the rear thereof with two longitudinal piston-chambers of different sizes and severally connected by a duct to the transverse piston-chamber respectively near its opposite ends, a differential piston in the transverse chamber, pistons in the longitudinal chambers of the front member adapted to force a liquid medium therefrom and extending respectively into a chamber in one of the other chambered members, these other chambers being provided with means for introducing a fluid piston-actuating medium thereto.

4. In a hydraulic motor for a riveting-machine, an elongated piston-chambered member having a transverse piston-chamber near one end, and a larger and a smaller piston-chamber adjacent to the transverse chamber and connected thereto severally by a duct for transmitting a fluid medium, a differential piston in the transverse chamber, and a fluid actuating piston in each of the other chambers.

5. In a hydraulic motor for a riveting-machine, an elongated member having a transverse piston-chamber and a larger and a smaller piston-chamber adjacent to and connected by a fluid-transmitting duct to the transverse chamber respectively, near each end thereof, a differential piston in the transverse chamber, a piston in the smaller of the other chambers under constant hydraulic pressure adapted to force a liquid medium from its chamber into the transverse chamber on that side of the piston exposing the lesser piston-surface, and a piston in the larger other chamber adapted to force a liquid medium into the transverse chamber on that side of the piston exposing the greater piston-surface.

In testimony whereof I affix my signature in presence of two witnesses.

JOHN THODE.

Witnesses:
C. T. BENEDICT,
ANNA F. SCHMIDTBAUER.